United States Patent
Tseng et al.

(10) Patent No.: US 12,335,800 B2
(45) Date of Patent: *Jun. 17, 2025

(54) USER EQUIPMENT (UE)-TRIGGERED HANDOVER WITH EARLY PREPARATION IN MOBILE NETWORKS

(71) Applicant: MEDIATEK INC., Hsinchu (TW)

(72) Inventors: Li-Chuan Tseng, Hsinchu (TW);
Yuanyuan Zhang, Beijing (CN);
Yung-Hsiang Liu, Hsinchu (TW);
Chun-Fan Tsai, Hsinchu (TW);
Chia-Chun Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,776

(22) Filed: Apr. 17, 2024

(65) Prior Publication Data

US 2024/0267806 A1 Aug. 8, 2024

Related U.S. Application Data

(63) Continuation of application No. 17/417,549, filed as application No. PCT/CN2019/109267 on Sep. 30, 2019, now Pat. No. 11,991,572.

(Continued)

(51) Int. Cl.
*H04W 36/00* (2009.01)
*H04W 36/36* (2009.01)

(52) U.S. Cl.
CPC . *H04W 36/00837* (2018.08); *H04W 36/0058* (2018.08); *H04W 36/0061* (2013.01);
(Continued)

(58) Field of Classification Search
None
See application file for complete search history.

(56) References Cited

U.S. PATENT DOCUMENTS

| 8,824,301 B2 | 9/2014 | Guo |
| 9,357,453 B2 | 5/2016 | Liu |

(Continued)

FOREIGN PATENT DOCUMENTS

| CN | 102026232 A | 4/2011 | |
| CN | 102067688 A * | 5/2011 | ............. H04L 1/189 |

(Continued)

OTHER PUBLICATIONS

Chinese language office action dated Aug. 25, 2021, issued in application No. CN 201980003643.2.

(Continued)

*Primary Examiner* — Kodzovi Acolatse
(74) *Attorney, Agent, or Firm* — McClure, Qualey & Rodack, LLP

(57) ABSTRACT

Methods and apparatus are provided for UE-triggered handover and early preparation with coexistence of the network-triggered handover. In one novel aspect, the UE is configured early measurement report configuration, receives an early handover command from the serving base station with a handover candidate cell list, monitors handover triggering conditions for each candidate cell on the handover candidate cell list based on a UE-triggered handover configuration and performs the UE-triggered handover to a candidate cell when the corresponding triggering condition is met for the candidate cell. In one embodiment, the UE receives a network-triggered handover command to a target cell, suspends the UE-triggered handover configuration and performs the network-triggered handover to the target cell. The UE discards the UE-triggered handover configuration upon success of the network-triggered handover and resumes the UE-triggered handover configuration upon failure of the network-triggered handover.

11 Claims, 12 Drawing Sheets

Related U.S. Application Data

(60) Provisional application No. 62/754,658, filed on Nov. 2, 2018, provisional application No. 62/741,663, filed on Oct. 5, 2018.

(52) U.S. Cl.
CPC . *H04W 36/00838* (2023.05); *H04W 36/0085* (2018.08); *H04W 36/36* (2013.01); *H04W 36/362* (2023.05)

(56) References Cited

U.S. PATENT DOCUMENTS

| | | | |
|---|---|---|---|
| 9,906,993 | B2 | 2/2018 | Singh |
| 9,949,181 | B2 | 4/2018 | Zhou |
| 10,939,335 | B2 | 3/2021 | Jung |
| 2012/0088507 | A1 | 4/2012 | Legg |
| 2019/0053109 | A1* | 2/2019 | Tambaram Kailasam ............... H04W 24/10 |
| 2019/0059029 | A1* | 2/2019 | Lunden ............... H04W 36/38 |
| 2019/0223073 | A1* | 7/2019 | Chen ............... H04W 36/0077 |
| 2020/0187069 | A1* | 6/2020 | Hong ............... H04W 36/0061 |
| 2020/0280890 | A1* | 9/2020 | Vikberg ............ H04W 36/0016 |
| 2021/0029618 | A1* | 1/2021 | Jain ............ H04W 8/02 |
| 2021/0235340 | A1* | 7/2021 | Moosavi ........... H04W 36/0094 |

FOREIGN PATENT DOCUMENTS

| | | | | |
|---|---|---|---|---|
| CN | 102238680 | A | 11/2011 | |
| CN | 102239723 | A | 11/2011 | |
| CN | 103596642 | A | 2/2014 | |
| CN | 103384398 | B | 5/2017 | |
| CN | 106941701 | A | 7/2017 | |
| JP | 6371873 | B2 | 8/2018 | |
| TW | 201304585 | A | 1/2013 | |
| TW | I513355 | B | 12/2015 | |
| TW | I520637 | B | 2/2016 | |
| WO | 2012/130170 | A1 | 10/2012 | |
| WO | 2015/094701 | A1 | 6/2015 | |
| WO | WO-2016026151 | A1 * | 2/2016 | ......... H04L 61/2007 |
| WO | WO-2017125591 | A1 * | 7/2017 | ............ H04W 36/00 |
| WO | WO-2019224674 | A1 * | 11/2019 | ............ H04W 24/08 |

OTHER PUBLICATIONS

International Search Report and Written Opinion dated Dec. 27, 2019, issued in application No. PCT/CN2019/109267.

Discussion on Conditional Handover in NR; 3GPP TSG-RAN WG2 Meeting #100 R2-1713747; Dec. 2017; pp. 1-6.

Chinese language office action dated Mar. 19, 2021, issued in application No. TW 108135455.

* cited by examiner

USER EQUIPMENT (UE)-TRIGGERED HANDOVER WITH EARLY PREPARATION IN MOBILE NETWORKS

CROSS REFERENCE TO RELATED PATENT APPLICATION(S)

This application claims is a Continuation of U.S. application Ser. No. 17/417,549, filed on Jun. 23, 2021 (now U.S. Pat. No. 11,991,572), which is a 371 National Phase of PCT Publication Number PCT/CN2019/109267, filed on Sep. 30, 2019, which claims priority under 35 U.S.C. § 119 from U.S. Provisional Application No. 62/741,663, entitled, "UE-triggered handover with early preparation in mobile networks," filed on Oct. 5, 2018; and U.S. Provisional Application No. 62/754,658, entitled, "Coexistence of Conditional and Normal Handover Mechanisms," filed on Nov. 2, 2018, the subject matters of which are incorporated herein by reference.

TECHNICAL FIELD

The disclosed embodiments relate generally to wireless communication, and, more particularly, to UE-triggered handover with early preparation.

BACKGROUND 5G radio access technology will be a key component of the modern access network. It will address high traffic growth and increasing demand for high-bandwidth connectivity. It will also support massive numbers of connected devices and meet the real-time, high-reliability communication needs of mission-critical applications. New Radio (NR) access technology is developed to meet a broad range of use cases and requirements for the next generation. One of the objectives is to support frequency ranges up to 100 GHz. While high frequency system offers larger bandwidth to each user equipment (UE) and boosts the throughput, the mobility becomes more challenging due to higher handover failure rate caused by sudden attenuation of signal strength. In the current NR system, only basic network-controlled handover mechanism is supported. When operating at high frequency, channel fluctuation is more severe, and a sudden drop of serving link is observed. In the NR network the links are more vulnerable to blockage by the human body or other objects. Such link failures between the serving gNB and the UE prohibits the UE from receiving handover commands.

In the NR network-controlled handover, similar to LTE, the target gNB and the timing for handover are determined by the source gNB. The source gNB triggers handover by sending HO request to target gNB and after receiving an ACK from the target gNB, the source gNB initiates handover by sending HO command with target cell configuration. The UE sends PRACH to the target cell after RRC reconfiguration is applied with target cell configuration. The network-controlled handover allows the network to fully control the UE behavior, but the decisions by source gNB may not be the best for UE in a fast-changing channel.

Enhancement of the handover procedure in the NR network is required.

SUMMARY

Methods and apparatus are provided for UE-triggered handover and early preparation with the coexistence of the network-triggered handover. In one novel aspect, the UE is configured early measurement report configuration, receives an early handover command from the serving base station with a handover candidate cell list, monitors handover triggering conditions for each candidate cell on the handover candidate cell list and performs the UE-triggered handover to a candidate cell when the corresponding triggering condition is met for the candidate cell. In one embodiment, the UE receives measurement report configuration from the network, monitoring triggering conditions for candidate cells on the handover candidate cell list based on a UE-triggered handover configuration. Subsequently, the UE receives a network-triggered handover command to a target cell, suspends the UE-triggered handover configuration and performs the network-triggered handover to the target cell. In one embodiment, the UE discards the UE-triggered handover configuration upon success of the network-triggered handover. In another embodiment, the UE resumes the UE-triggered handover configuration upon failure of the network-triggered handover. In one embodiment, the early handover command includes at least one early handover elements comprising a handover candidate cell list of handover candidate cells, corresponding triggering condition for each handover candidate cell on the handover candidate cell list, and an early handover indication. In another embodiment, the UE stores the early handover configuration, suspends the configuration when performs the network-triggered handover and performs the UE-triggered handover if the network-triggered handover fails.

In one embodiment, the UE is configured early measurement report configuration, receives an early handover command from the serving base station with a handover candidate cell list, monitors handover triggering conditions for each candidate cell on the handover candidate cell list and performs the UE-triggered handover to a candidate cell when the corresponding triggering condition is met for the candidate cell. In one embodiment, the early handover command includes at least one early handover elements comprising a handover candidate cell list of handover candidate cells, corresponding triggering condition for each handover candidate cell on the handover candidate cell list, and an early handover indication. In another embodiment, the handover candidate cell list in the early handover command is based on one or more early measurement reports performed by the UE according to the received early measurement report configuration. In yet another embodiment, the UE sends an early measurement report upon detecting one or more reporting conditions comprising detecting a cell quality of a neighboring cell is higher than a predefined quality threshold and detecting a cell quality of a neighboring cell is a predefined offset higher than a cell quality of the serving cell. When the UE operates in a multi-beam network, and the cell quality is determined to be over a threshold by meeting at least one condition comprising a weighted average of qualities of some or all of beams being over the threshold, and a predefined number of beams with corresponding measurement being above the threshold. In one embodiment, the UE performs a random access to the candidate cell and sends a handover complete message to the serving cell upon success of the random access. Subsequent to receiving the early handover command, a network-triggered handover command to a target cell is received before the performing of the UE-triggered handover. The UE performs a network-triggered handover to the target cell and performs the UE-triggered handover upon determining a failure of the network-triggered handover. In one embodiment, the UE stores a UE-triggered handover configuration upon receiving the early handover command, wherein the UE-triggered handover configuration comprising the handover candidate cell list of handover candidate cells. In another embodiment, the UE-triggered handover configuration further comprises at least one of corresponding cell identification (ID) of each candidate cell, corresponding C-RNTI, and corresponding security algorithm identifier of each candidate cell. In another embodiment, upon receiving a network-triggered handover command towards a target cell, the UE suspends the UE-triggered handover configuration. In yet another embodiment, the UE discards the UE-triggered handover configuration upon a successful completion of a network-triggered handover to the target cell, and wherein the UE reassumes the suspended UE-triggered handover configuration upon a failure of a network-triggered handover to the target cell.

In another novel aspect, the source base station preparing an early handover command for a UE, wherein the early handover command comprises at least one early handover elements comprising a handover candidate cell list of handover candidate cells, corresponding triggering condition for each handover candidate cell on the handover candidate cell list, and an early handover indication. The source base station sends the early handover command to the UE and prepares one or more handover candidate cells for a UE-triggered handover based on one or more triggering events. In one embodiment, the source base station performs sequence number (SN) STATUS TRANSFER to the handover candidate cells. The source base station sends a CONDITIONAL HANDOVER REQUEST to each of the candidate cells and receives corresponding CONDITIONAL HANDOVER RESPONSE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION OF PREFERRED IMPLEMENTATIONS

Reference will now be made in detail to some embodiments of the invention, examples of which are illustrated in the accompanying drawings.

Figure 1:
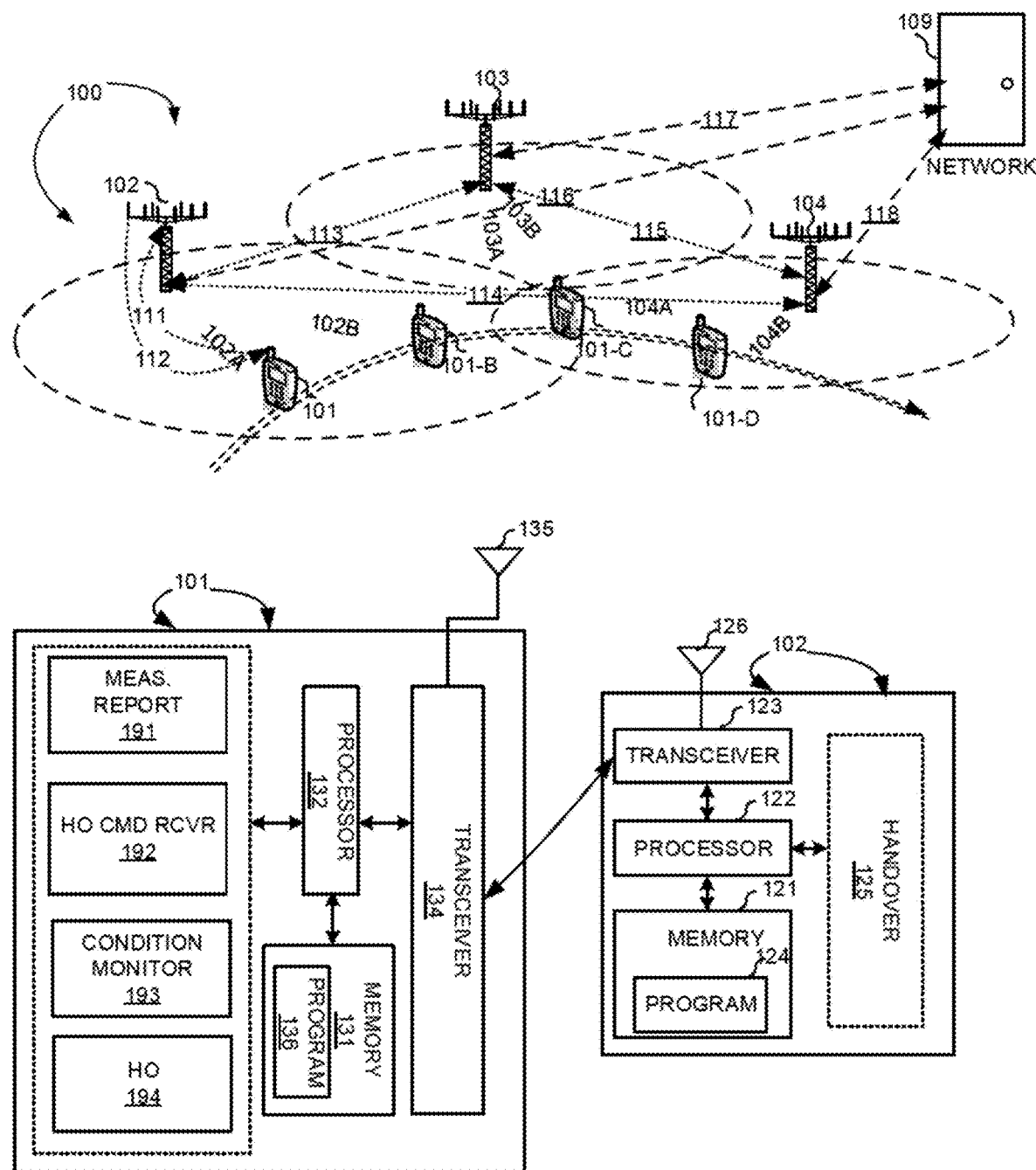
FIG. 1 illustrates an exemplary wireless network 100 with early handover in accordance with embodiments of the current invention.

FIG. 1 illustrates an exemplary wireless network 100 with early handover in accordance with embodiments of the current invention. Wireless communication system 100 includes one or more wireless networks each of the wireless communication network has fixed base infrastructure units, such as receiving wireless communications devices 102 103, and 104, forming wireless networks distributed over a geographical region. The base unit may also be referred to as an access point, an access terminal, a base station, a Node-B, an eNode-B, or by other terminology used in the art. Each of the receiving wireless communications devices 102, 103, and 104 serves a geographic area. Backhaul connections 113, 114 and 115 connect the non-co-located receiving wireless communications devices, such as 102, 103, and 104. These backhaul connections can be either ideal or non-ideal.

A wireless communications device 101 in wireless network 100 is served by base station 102 via uplink 111 and downlink 112. Other wireless communications devices 105, 106, 107, and 108 are served by different base stations. Wireless communications devices 105 and 106 are served by base station 102. Wireless communications device 107 is served by base station 104. Wireless communications device 108 is served by base station 103.

In one embodiment, wireless communication network 100 is an OFDMA/NR system comprising base stations 102, 103 and 104, and mobile stations, such as wireless station/UE 101. The base stations can be eNBs, gNBs, access points (Aps) or other wireless stations. In other embodiments, the base station can be multi-beam stations. Base station 102 has multi beams such as 102A and 102B. Similarly, base station 103 has multi beams such as 103A and 103B, and base station 104 has multi beams such as 104A and 104B. In the applications, each base station serves multiple wireless communications devices that periodically transmit packets. A network entity, such as a wireless controller 109 is connected to base stations such as base station 102, 103, and 104, via links of 116, 117, and 118.

In one novel aspect, early handover/conditional handover and early handover preparation are performed by the network. Conventionally, in NR network-controlled handover, similar to LTE, the target gNB and the timing for handover are determined by the source gNB. The source gNB triggers handover by sending HO request to a target gNB and after receiving an ACK from the target gNB, the source gNB initiates handover by sending HO command with target cell configuration. The UE sends PRACH to the target cell after RRC reconfiguration is applied with target cell configuration. The network-controlled handover allows the network to fully control the UE behavior, but the decisions by source gNB may not be the best for UE in a fast-changing channel. To improve mobility robustness, the early handover/conditional handover mechanism is provided. In early handover, the source gNB also sends handover command to UE, but the command is associated with some conditions. The UE performs handover to the indicated target gNB not right upon receiving the handover command but when the conditions are met. If both normal and conditional handover mechanisms are to be configured, additional procedures need to be introduced to ensure proper coexistence of two handover procedures run on a single UE.

In one novel aspect, early handover and early preparation are performed by the UE to improve the handover procedure for network 100. Initially, UE 101 is connected to source gNB 102 via uplink 111 and downlink 112. In one embodiment, UE 101 receives measurement report configuration from the network. The measurement report includes early measurement configurations. UE performs measurements. As UE 101 moves, at 101-B, UE 101 may send a measurement report to the source gNB 102. Source gNB 102 makes early handover decisions and send early handover command to UE 101. In one embodiment, source gNB 102 prepares candidate cells, such as gNB 103 and gNB 104 for handover. The early handover preparation for gNB 103 and gNB 104 includes performs admission control for the potential handover. The early handover command to UE 101 may include a list of candidate handover cells, such as gNB 103 and gNB 104. In another embodiment, the early handover command may also include corresponding handover conditions for each candidate cells. UE 101 monitors these handover conditions. As UE 101 continues moving, at 101-C, UE 101 detects a handover condition for the early handover. UE 101 triggers a UE-triggered handover procedure to gNB 104. At 101-D, UE 101 successfully connected to the gNB 104.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as handover circuit 125 that carry out functional tasks to communicate with wireless communications devices.

Wireless communications device 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

Wireless communications device 101 also includes a set of control modules that carry out functional tasks. a measurement report circuit 191 receives an early measurement report configuration that configures UE early measurement reports from a serving cell. A handover command receiver 192 receives an early handover command from the serving base station, wherein the early handover command comprising a handover candidate cell list of handover candidate cells, corresponding triggering condition for each handover candidate cell on the handover candidate cell list, and an early handover indication. A condition monitor 193 monitors triggering conditions for candidate cells on the handover candidate cell list based on a UE-triggered handover configuration. A handover circuit 194 upon receiving a network-triggered handover command to a target cell suspends the UE-triggered handover configuration.

Figure 2:
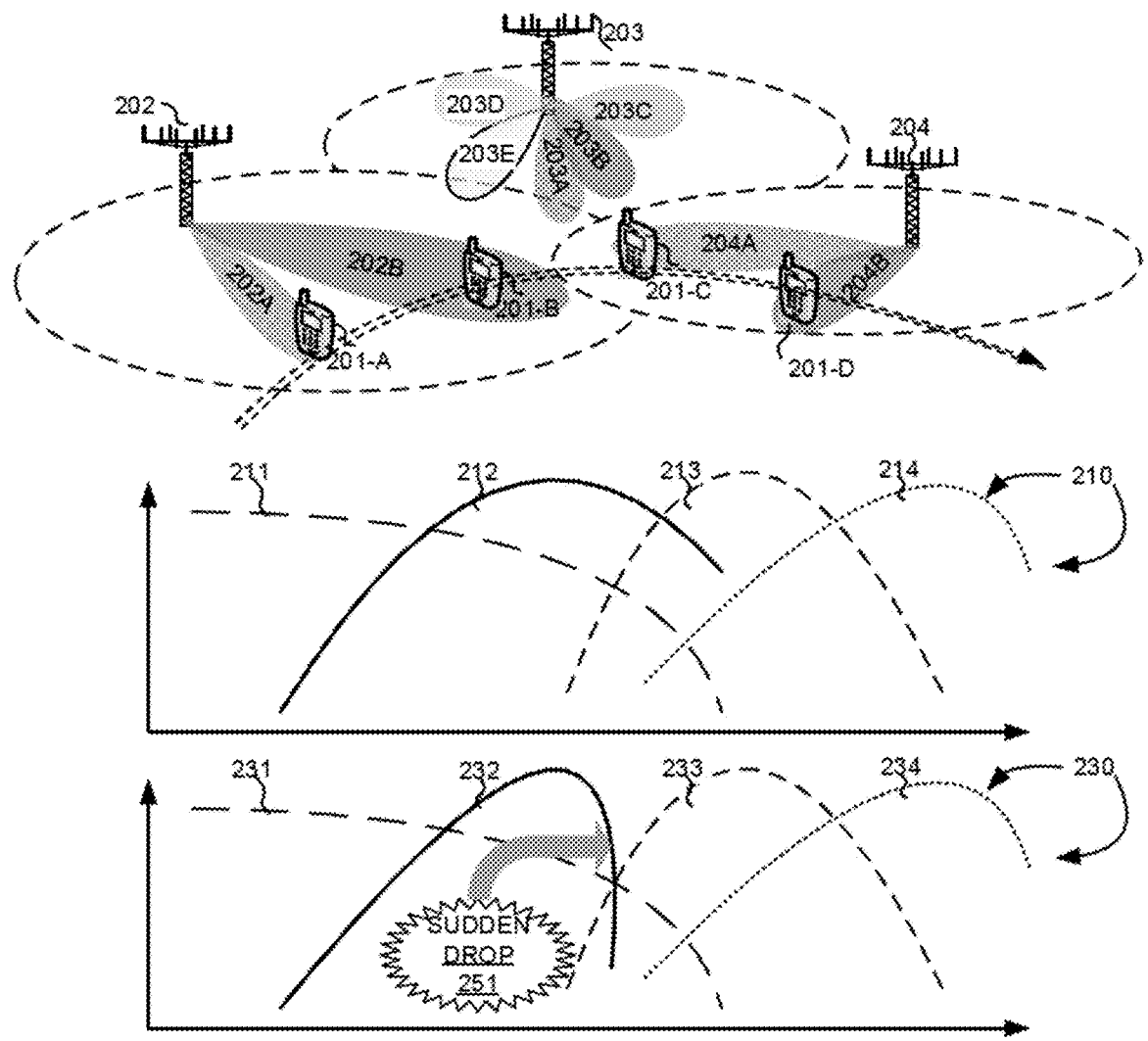
FIG. 2 illustrates exemplary diagrams for a moving UE changing cells in a multi-beam frequency system and performing a normal handover vs. a UE-triggered handover in accordance with embodiments of the current invention.

FIG. 2 illustrates exemplary diagrams for a moving UE changing cells in a multi-beam frequency system and performing a normal handover vs. a UE-triggered handover in accordance with embodiments of the current invention. UE 201 is connected to a source gNB 202 in a multi-beam frequency system. gNB 202 has multi beams such as 202A and 202B. Neighboring cell gNB 203 has multi beams such as 203A and 203B. Neighboring cell gNB 204 has multi beams such as 204A and 204B. In a normal situation, as UE 201 moves from 201-A to 201-B to 201-C and to 201-D, as in diagram 210, UE 201 detects signals for beam 202A, 202B, 204A and 204B as curves 211, 212, 213, and 214, respectively. In a conventional way, UE 201 handover to gNB 204 at 201-C where 204A beam quality of 213 of gNB 204 is offset better than 201B beam quality of 212. UE 201 at 201C handover to gNB 204 and connected beam 204A. As UE continues moving, at 201-D, UE 201 may handover to beam 204B of gNB 204.

However, as in diagram 230, as UE 201 moves from 201-A to 201-B to 201-C and to 201-D, UE 201 detects signals for beam 202A, 202B, 204A and 204B as curves 231, 232, 233, and 234, respectively. Beam 202B, as shown in curve 232, has a sudden drop of quality at 251. As result of this, the conventional network-triggered handover may fail because the UE may not be able to receive the handover command as the signal quality of 202B drops suddenly. In one novel aspect, early handover and early handover preparation may be performed. As UE 201 moves 201-B, the UE may trigger early measurement report based on an early measurement report configuration. The early measurement report may include measurements for gNB 203. Subsequently, a conditional handover command/early handover command is received from the network, with a candidate list includes gNB 203 and gNB 204. In one embodiment, when the network-triggered handover to gNB 204 failed, UE 201 may perform a UE-triggered handover based on the early handover command received. UE 201 may perform the UE-triggered handover to gNB 204 based on the triggering condition being met even though the network-triggered handover command is lost or failed.

Figure 3:
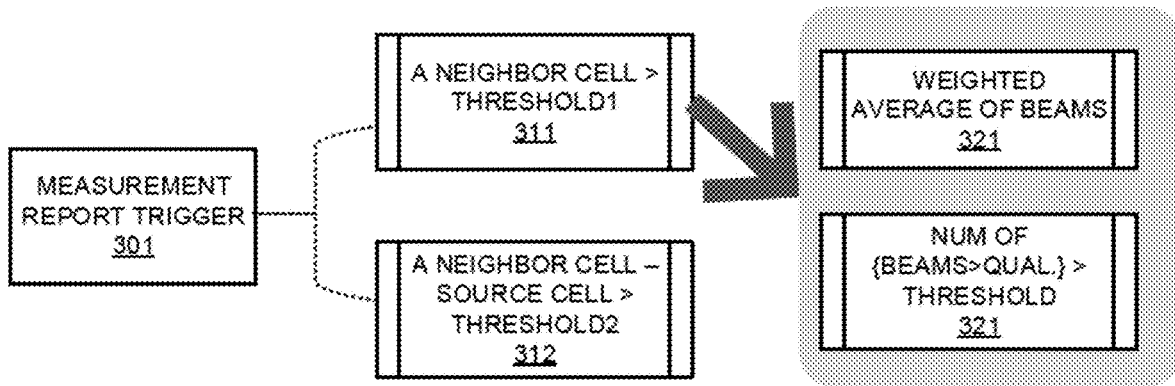
FIG. 3 illustrates an exemplary diagram for an early measurement report in accordance with embodiments of the current invention.

FIG. 3 illustrates an exemplary diagram for an early measurement report in accordance with embodiments of the current invention. In one embodiment, early measurement report configuration is received by the UE. The early measurement configuration may configure a periodic measurement report for the UE and/or an event triggered measurement report. Measurement report trigger 301 may include one or more conditions such as 311 and 312. At condition 311, the UE detects a neighboring cell that is above a threshold. At condition 312, the UE detects a neighboring cell that is offset better than the serving cell. The offset used to trigger earlier measurement report can be lower than that for a normal measurement, such as an A3 event. Moreover, when comparing a multi-beam cell with another one or against a threshold, a cell is represented by a single cell quality value derived from the measurements from multiple beams. The condition for the cell quality in a multi-beam cell can be determined in one or more predefined manners such as 321 and 322. Measurement 321 measures a cell quality by a weighted average of qualities of some or all of beams. Measurement 322 measures a cell quality by counting the number of beams with quality higher than a threshold. The measurement report may contain neighboring cell IDs, cell quality, beam-level quality, or other measurements configured by the network.

Figure 4:
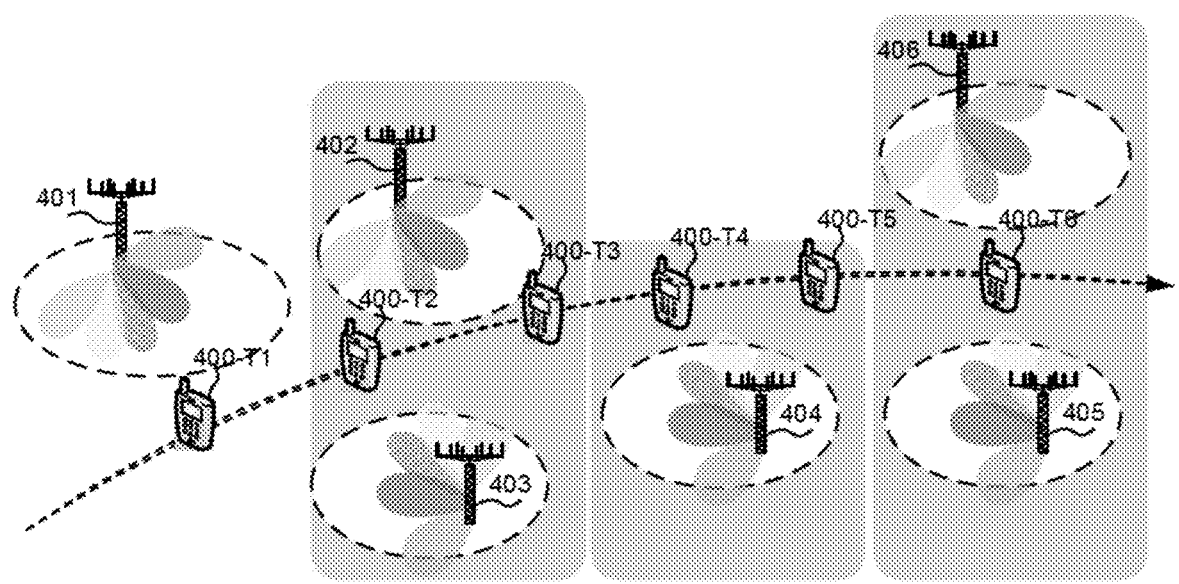
FIG. 4 illustrates a details diagram of mobility-related events at different time instants for the UE-triggered handover in accordance with embodiments of the current invention.

FIG. 4 illustrates a details diagram of mobility-related events at different time instants for the UE-triggered handover in accordance with embodiments of the current invention. UE 400 is connected to source gNB 401 of cell-1 at time 400-T1. The network indicates gNB 402 of cell-2 and gNB 403 of cell-3 are potential target/candidate cells. In one embodiment, UE 400 receives an early handover command from the network with a candidate cell list of cell-2 and cell-3. In another embodiment, the early handover command also includes handover conditions for cell-2 and cell-3. At time 400-T1, UE 400 detects handover condition for cell-2 is met. UE 400 performs handover to gNB 402 of cell-2. At time 400-T3, the network indicates gNB 404 of cell-4 as potential target cell or candidate cell. In one embodiment, UE 400 receives an early handover command from the network with a candidate cell list of cell-4 and optionally includes the handover triggering condition for cell-4. At 400-T4, UE 400 detects handover condition for cell-4 is met. UE 400 performs handover to gNB 404 of cell-4. At time 400-T5, the network indicates gNB 405 of cell-5 and gNB 406 of cell-6 are potential target/candidate cells. In one embodiment, UE 400 receives an early handover command from the network with a candidate cell list of cell-5 and cell-6 and optionally includes handover conditions for cell-5 and cell-6. At time 400-T6, UE 400 detects handover condition for cell-5 is met. UE 400 performs handover to gNB 405 of cell-5.

Figure 5:
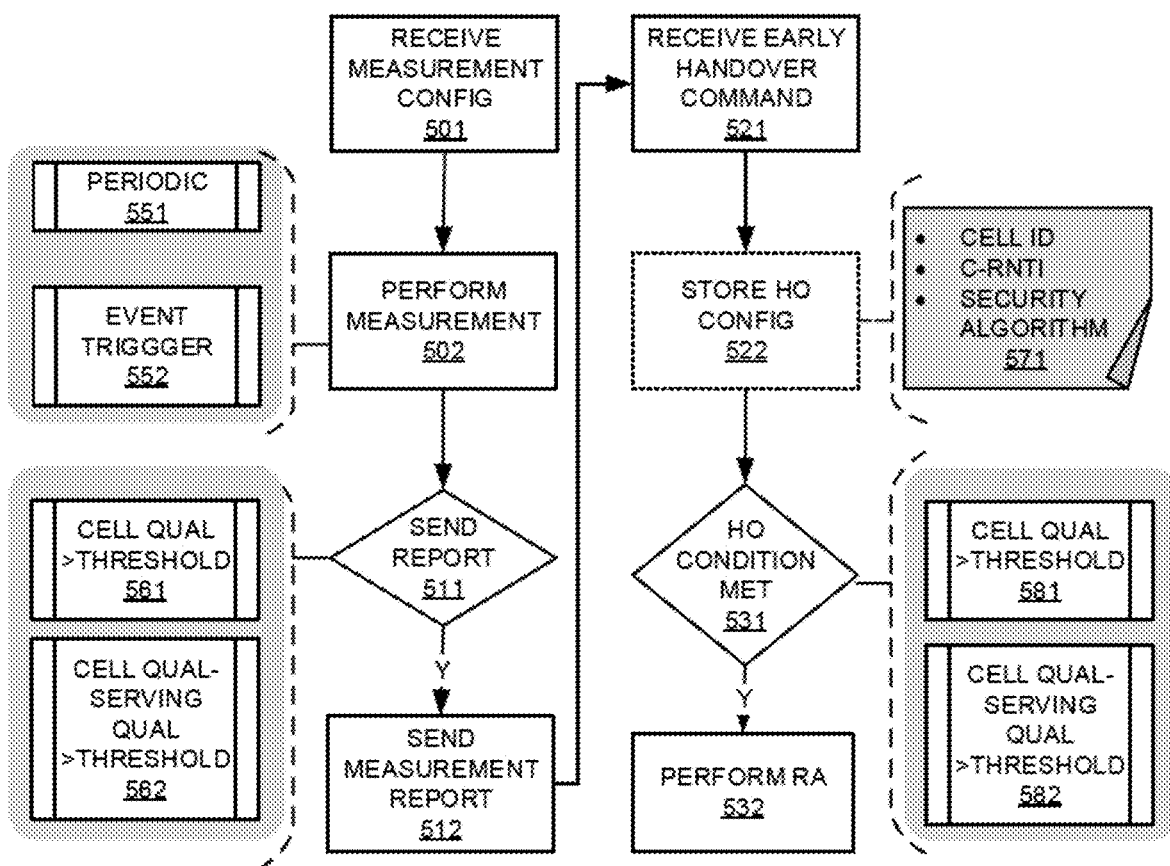
FIG. 5 illustrates an exemplary diagram for a UE-triggered handover with early preparation in accordance with embodiments of the current invention.

FIG. 5 illustrates an exemplary diagram for a UE-triggered handover with early preparation in accordance with embodiments of the current invention. At step 501, the UE receives measurement report configuration from the network. In one embodiment, the measurement report configuration includes early measurement report configuration for the UE-triggered handover. At step 502, the UE performs measurement of neighboring cell according to the measurement report configuration. In one embodiment, the measurement report is periodic 551. In another embodiment, the measurement report is event triggered 552. At step 511, the UE sends the measurement. In some embodiments, the sending of the measurement report is triggered by one or more triggering conditions such as 561 and 562. In 561, the measurement report is sent upon detecting the neighboring cell quality is higher than a predefined threshold. In one embodiment, the predefined threshold is lower than for the conventional measurement report. In 562, the measurement report is sent upon detecting the neighboring cell quality is an offset better than the serving cell quality. The above conditions are similar to the triggering conditions of measurement events, but the parameters can be different. For example, the offset used to trigger earlier measurement report can be lower than that for a normal A3 event. Moreover, when comparing a multi-beam cell with another one or against a threshold, a cell is represented by a single cell quality value derived from the measurements from multiple beams. The measurement report may contain neighboring cell IDs, cell quality, beam-level quality, other measurement configured by the network. If step 511 determines yes, the UE sends the measurement report at step 512.

Upon receiving the measurement report, the network makes early handover decisions based on the measurement report. Upon receiving early measurement report, the serving gNB evaluates whether the reported neighbor cells can be good candidates. If a cell is considered as potential target for handover in the future, the serving gNB prepares the target by sending early handover request carrying UE context. If positive response is received, serving gNB sends an early handover command to UE, indicating potential target cells that have been prepared. At step 521, the UE receives early handover command from the network. The handover command includes a handover configuration. The network upon sending the early handover command, prepares one or more candidate cells included early handover command.

In one embodiment, the UE upon receiving the early handover command, stores the handover configuration included in the early handover command. The early handover command includes a handover cell list of one or more candidate cells. In one embodiment, the early handover command also includes corresponding handover conditions for each candidate cell. In another embodiment, the handover condition may be a general condition applying to all or multiple cells.

The proposed mechanism allows UE to determine the exact triggering point of handover. The UE may evaluate and chooses a target cell from the candidates indicated by the earlier handover command. The serving cell falls below a threshold for a given duration. The conditions include (1) UE experience RLF (i.e. serving cell falls below out-of-sync threshold and RLF timer expires), (2) UE cannot decode control channel for a given duration that is shorter than RLF timer, or (3) serving cell falls below a threshold higher than the out-of-sync threshold for a given duration. The UE detects a neighboring cell satisfying the conditions for A3-like event, such as the neighboring cell is offset better than the serving cell within a given duration. In one embodiment, the triggering condition of UE-triggered handover is up to UE implementation. In another embodiment, the network provides some suggestions in the early handover command. If UE possesses a list of multiple potential target cells, it is up to UE implementation which cell to be chosen as the target cell. For example, the UE may choose the target cell with highest RSROP or RSRQ or the first candidate target cell that is still valid.

The network may also indicate whether UE should continue to operate legacy handover after receiving early handover command, and the UE may adjust its handover triggering mechanism accordingly. For example, if UE does not operate legacy handover, the (UE-triggered) handover triggering condition should be based on comparing serving and neighboring cell quality (e.g., A3-like), or based on serving cell quality but the threshold should not be too low. In contrast, if legacy handover is still operated, UE may adopt either triggering mechanism In another embodiment, the early handover command further includes other cell information 571, such as the cell IE, the C-RNTI, and the candidate gNB security algorithm identifiers for the selected security algorithms. At step 531, the UE monitors the early handover conditions and determines if one or more conditions are met. In one embodiment, the conditions are evaluated based on one or more criteria, such as 581 and 582. In 581, the condition is met upon detecting the neighboring cell quality is higher than a predefined threshold. In one embodiment, the predefined threshold is lower than for the conventional measurement report. In 582, the condition is met upon detecting the neighboring cell quality is an offset better than the serving cell quality. If step 531 determines yes, the UE, at step 532, starts a random access to the corresponding candidate cell.

In one novel aspect, UE-triggered handover is performed to improve the handover procedure. The UE performs periodic measurements on serving and neighboring cells and delivers measurement report. Based on the measurement report, the serving gNB sends earlier handover command to UE, indicating potential target cells for a UE. Serving gNB also prepares the potential target cells, i.e., delivers UE context to these cells. The UE performs handover evaluation on the target cells. When the handover criterion is fulfilled for a neighbor cell, the UE performs random access toward the selected target cell. After the RACH completes, the UE sends handover complete message to the new serving gNB.

Figure 6:
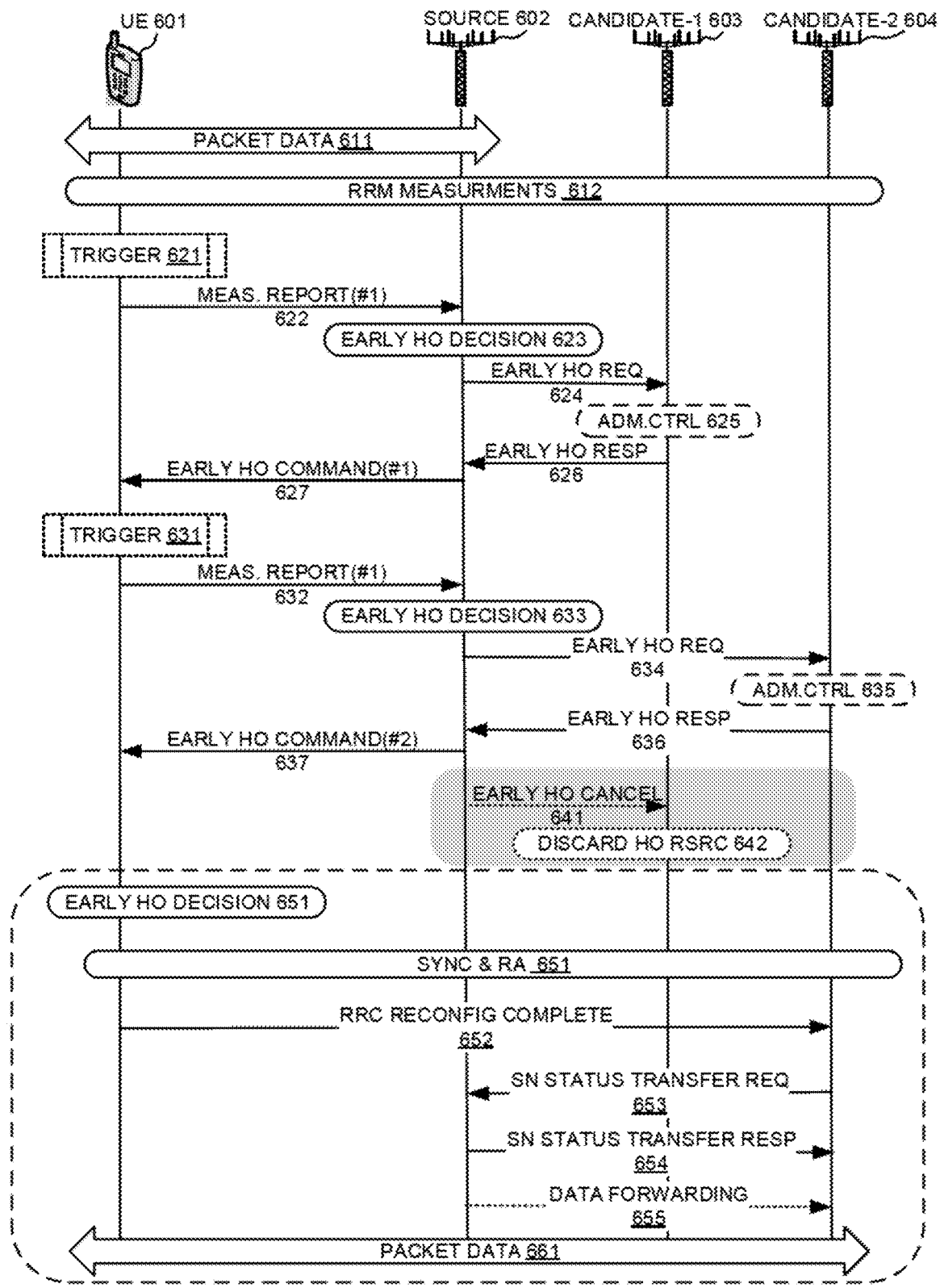
FIG. 6 illustrates an exemplary flow diagram for an early handover command with a success UE-triggered handover procedure in accordance with embodiments of the current invention.

FIG. 6 illustrates an exemplary flow diagram for an early handover command with a success UE-triggered handover procedure in accordance with embodiments of the current invention. UE 601 is connected to source gNB 602 with packet data 611. At step 612, the UE performs RRM measurement. In one embodiment, the measurement is performed based on measurement report configuration received from the network. At step 621, the UE detects an early measurement trigger event. At step 622, the UE sends an early measurement report. At step 623, source gNB 602 made early handover decision based on the received measurement report. Source gNB 602 prepares candidate cells for handover. At step 624, source gNB 602 sends an early handover request to candidate-1 gNB 603. At step 626, gNB 603 upon receiving the early handover request, prepares for the handover, such as admission control. At step 626, gNB 603 sends an early handover response to source gNB 602. At step 627, gNB 602 sends an early handover command to UE 601. At step 631, the UE detects an early measurement trigger event. At step 632, the UE sends an early measurement report. At step 633, source gNB 602 made early handover decision based on the received measurement report. Source gNB 602 prepares candidate cells for handover. At step 624, source gNB 602 sends an early handover request to candidate-1 gNB 604. At step 636, gNB 604 upon receiving the early handover request, prepares for the handover, such as admission control. At step 636, gNB 604 sends an early handover response to source gNB 602. At step 637, gNB 602 sends an early handover command to UE 601. Optionally, at step 641, gNB 602 sends an early handover cancellation to gNB 603. At step 642, gNB 603 discards the handover resources for UE 601.

The UE upon receiving one or more early handover commands, monitors handover triggering conditions. At step 651, UE 601 makes early handover decisions. Upon determining one or more triggering conditions are met, the UE performs the UE-triggered handover. At step 651, UE 601 performs synchronization and RA with gNB 604. At step 652, UE 601 sends an early handover complete message to gNB 604. In one embodiment the early handover complete message is an RRC reconfiguration complete message. At step 653, gNB 604 sends sequence number (SN) status transfer request message to source gNB 602. At step 654, gNB 602 sends SN status transfer response message. At step 655, gNB 602 performs data forwards to gNB 604. At step 661, UE 601 transmits and receives packet data with gNB 604.

A UE supporting UE-triggered handover may operates legacy handover procedure at the same time, that is, it still sends legacy measurement reports and receives legacy handover command. In this case, UE may switch from one kind of handover procedure to another. In most cases, early measurement report is sent earlier than legacy measurement report. If UE-triggered handover is set to be triggered based on serving cell quality, after receiving conditional handover command, UE may still evaluate neighboring cells based on legacy measurement event configurations. Moreover, if the target cell chosen later is prepared due to early handover command, source gNB needs not to send handover request to target gNB.

Figure 7:
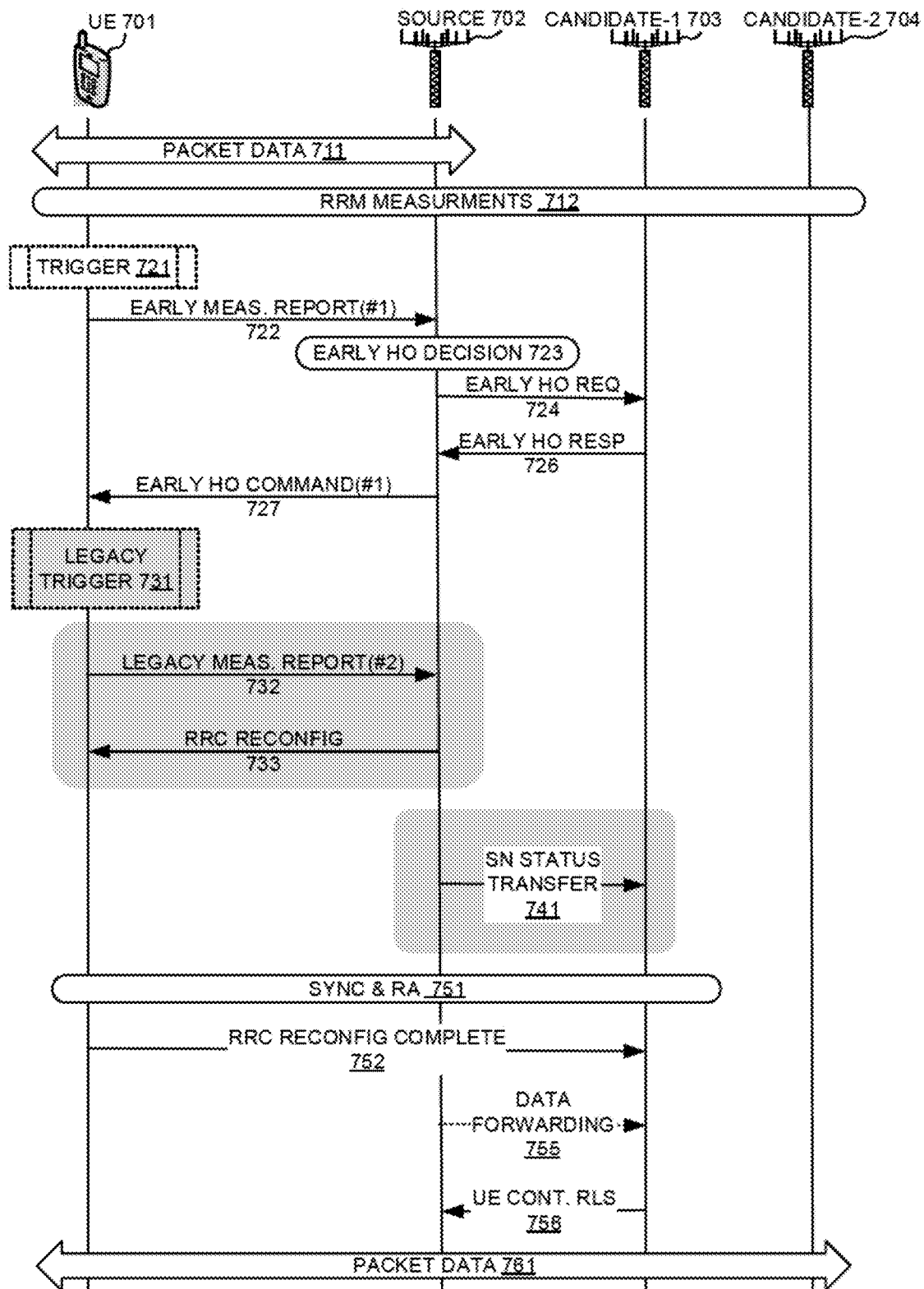
FIG. 7 illustrates an exemplary flow diagram for a UE performing legacy handover after early handover preparation in accordance with embodiments of the current invention.

FIG. 7 illustrates an exemplary flow diagram for a UE performing legacy handover after early handover preparation in accordance with embodiments of the current invention. UE 701 is connected to source gNB 702 with packet data 711. The network also has gNB 703 and 704. At step 712, the UE performs RRM measurement. In one embodiment, the measurement is performed based on measurement report configuration received from the network. At step 721, the UE detects an early measurement trigger event. At step 722, the UE sends an early measurement report. At step 723, source gNB 702 made early handover decision based on the received measurement report. Source gNB 702 prepares candidate cells for handover. At step 724, source gNB 702 sends an early handover request to candidate-1 gNB 703. gNB 703 upon receiving the early handover request, prepares for the handover, such as admission control. At step 726, gNB 703 sends an early handover response to source gNB 702. At step 727, gNB 702 sends an early handover command to UE 701.

At step 731, UE 701 detects legacy measurement trigger event. At step 732, the UE 701 sends legacy measurement report. Source gNB 702 determines a network-triggered handover. At step 733, source gNB 702 sends an RRC reconfiguration to UE 701. In one embodiment, source gNB 702 chooses the target gNB as gNB 702. Since gNB 702 is a candidate cell for the early handover, there is no need for preparation for the legacy handover. At step 741, source gNB 702 sends SN status transfer to gNB 703.

Upon receiving the RRC reconfiguration message, at step 751, UE 601 performs synchronization and RA with gNB 703. At step 752, UE 701 sends an early handover complete message to gNB 703. At step 755, gNB 702 performs data forwards to gNB 703. At step 756, gNB 703 sends UE content release to source gNB 702. At step 761, UE 701 transmits and receives packet data with gNB 703.

In one embodiment, the UE-triggered handover may also serve as a failure recovery mechanism for the network-triggered handover. Assuming the UE-triggered handover being set to be triggered based on serving cell quality and UE still evaluates legacy measurement events, the UE receives conditional handover conditional command for a candidate gNB #2. Subsequently, the UE sends legacy measurement report for a target gNB #1 when it moves toward cell edge. If the UE experiences sudden channel degradation, it fails to receive legacy handover command for target gNB #1. Instead of triggering RRC reestablishment due to handover failure, the UE with conditional handover target gNB #2 can perform RACH and send UE-triggered handover indication to target gNB #2. The method leads to faster recovery from handover failure. In another scenario, the early handover command may include both gNB #1 and gNB #2. When the network-triggered handover to gNB #1 failed due to the link failure in the source gNB and missing the handover command, the UE may still perform the UE-triggered handover to gNB #1 as well.

Figure 8:
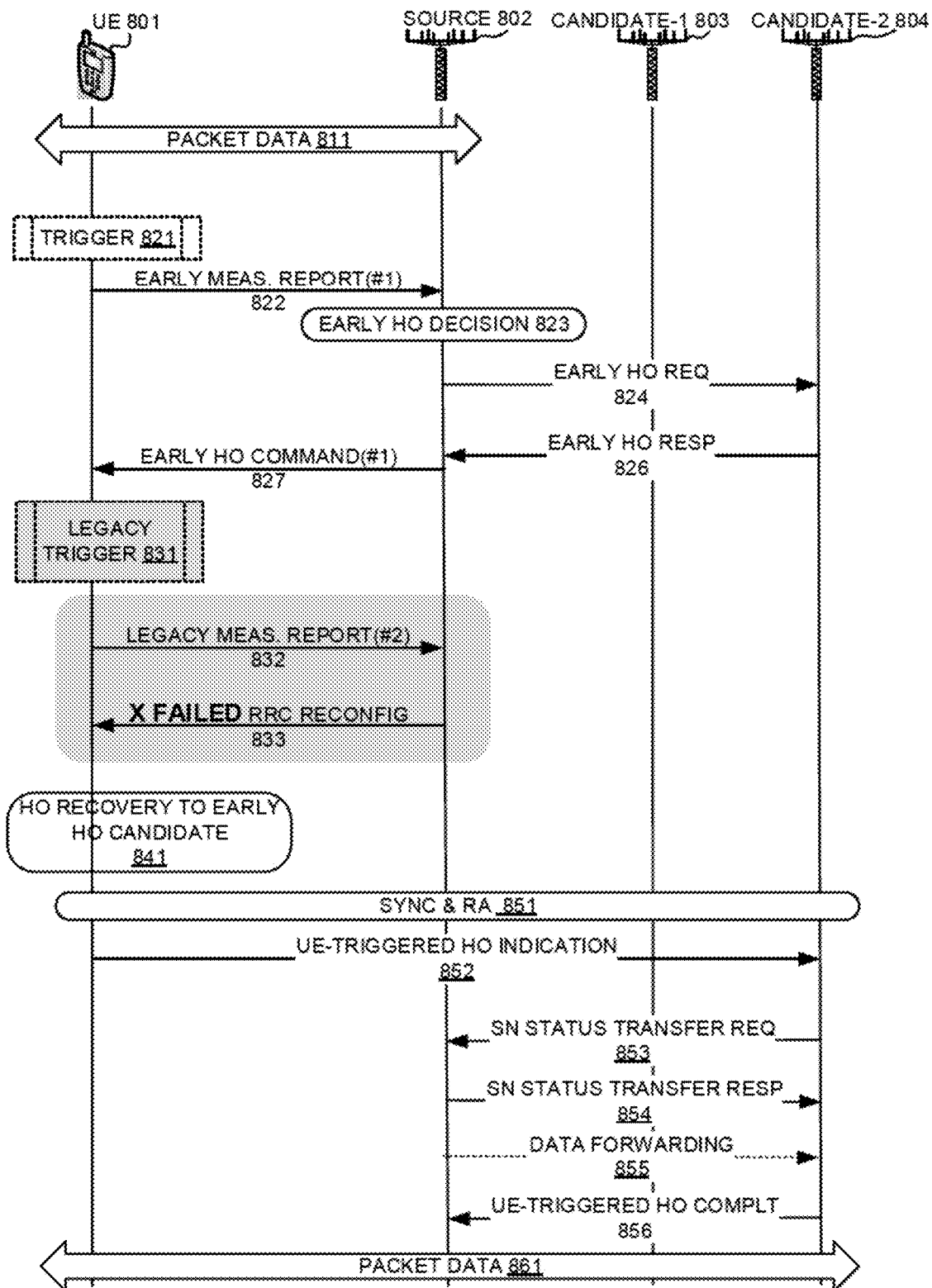
FIG. 8 illustrates an exemplary flow diagram of a UE fall back to perform the UE-triggered handover after the failure of the network-triggered handover in accordance with embodiments of the current invention.

FIG. 8 illustrates an exemplary flow diagram of a UE fall back to perform the UE-triggered handover after the failure of the network-triggered handover in accordance with embodiments of the current invention. UE 801 is connected to source gNB 802 with packet data 811. The network also has gNB 803 and 804. At step 821, the UE detects an early measurement trigger event. At step 822, the UE sends an early measurement report. At step 823, source gNB 802 made early handover decision based on the received measurement report. Source gNB 802 prepares candidate cells for handover. At step 824, source gNB 802 sends an early handover request to candidate-1 gNB 804. gNB 804 upon receiving the early handover request, prepares for the handover, such as admission control. At step 826, gNB 804 sends an early handover response to source gNB 802. At step 827, gNB 802 sends an early handover command to UE 801. At step 831, UE 801 detects legacy measurement trigger event. At step 832, the UE 801 sends legacy measurement report. Source gNB 802 determines a network-triggered handover. At step 833, source gNB 802 sends an RRC reconfiguration to UE 801. However, the RRC reconfiguration at step 833 is failed.

In one embodiment, upon the failure of the network-triggered handover, the UE performs the UE-triggered handover at step 841. At step 851, UE 801 performs synchronization and RA with gNB 804. At step 852, UE 801 sends a UE-triggered handover indication to gNB 804. At step 853, gNB 804 sends sequence number (SN) status transfer request message to source gNB 802. At step 854, gNB 802 sends SN status transfer response message. At step 855, gNB 802 performs data forwards to gNB 804. At step 856, gNB 804 sends UE content release to source gNB 802. At step 861, UE 801 transmits and receives packet data with gNB 803.

In one novel aspect, the UE-triggered handover, or conditional handover (CHO) coexists with the network-triggered handover, or the legacy handover. The UE-triggered/CHO is a mobility procedure for UEs in connected mode, where a handover command sent by source gNB is associated with potential target gNB(s) and certain conditions, and the UE performs handover to a target gNB once the conditions are met. The handover command is used for both the UE-triggered handover and the network-triggered handover. The handover command sent by source gNB to UE, indicating the target or candidate cell. The command can be carried by RRC messages, such as the RRC connection reconfiguration. The command can indicate a normal handover, which is to be performed immediately, or a conditional handover, which is performed when the condition is met.

Figure 9A:
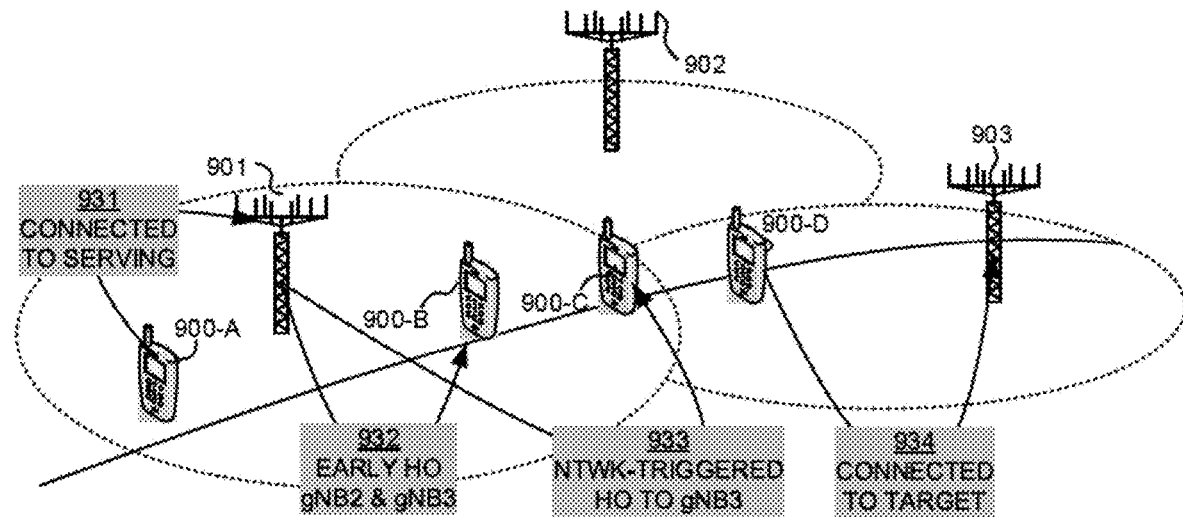
FIG. 9A illustrates an exemplary diagram for a UE configured with both the UE-triggered handover and the network-triggered handover and succeeds in the network-triggered handover in accordance with embodiments of the current invention.

FIG. 9A illustrates an exemplary diagram for a UE configured with both the UE-triggered handover and the network-triggered handover and succeeds in the network-triggered handover in accordance with embodiments of the current invention. At time 900-A, UE 900 is connected to source gNB 901 at step 931 in a wireless network, which also includes neighboring gNB 902 and gNB 903. At time 900-B, UE 900 moves and an early handover command is received from source gNB 901 at step 932. The early handover command includes candidate cells served by gNB 902 and gNB 903. At time 900-C, UE 900 receives network-triggered handover command to gNB 903, at step 933, and performs the handover to gNB 903. At time 900-D, UE 900 successfully connected to gNB 903 at step 934. In one embodiment, the UE performs the network-triggered handover to gNB 903, which is also on the UE-triggered candidate cell list. Upon succeeds in the network-triggered handover, UE 900 discards the early handover configuration.

Figure 9B:
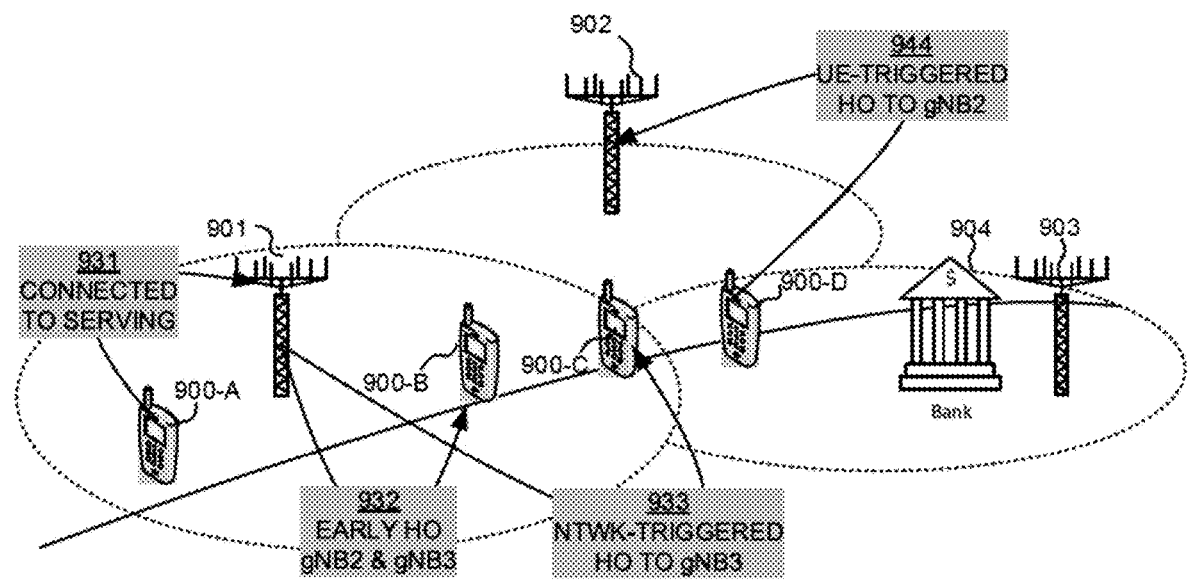
FIG. 9B illustrates an exemplary diagram for a UE configured with both the UE-triggered handover and the network-triggered handover and succeeds in the UE-triggered handover in accordance with embodiments of the current invention.

FIG. 9B illustrates an exemplary diagram for a UE configured with both the UE-triggered handover and the network-triggered handover and succeeds in the UE-triggered handover in accordance with embodiments of the current invention. At time 900-A, UE 900 is connected to source gNB 901 at step 931 in a wireless network, which also includes neighboring gNB 902 and gNB 903. At time 900-B, UE 900 moves and an early handover command is received from source gNB 901 at step 932. The early handover command includes candidate cells served by gNB 902 and gNB 903. At time 900-C, UE 900 receives network-triggered handover command to gNB 903, at step 933. However, before UE 900 completes random access to gNB 903, the path to source gNB 902 experiences blockage by a building. In normal handover, this results in radio link failure (RLF).

To prevent UE from triggering RLF in such cases, the UE may suspend the UE-triggered handover configurations instead of discarding them. In one embodiment, the network-triggered handover is the major mobility mechanism, and the UE-triggered handover is a failure recovery mechanism. For example, the early handover condition may be set as being the source gNB falls below a threshold and the candidate gNB is above another threshold. In the current example, it is satisfied for gNB 902 when UE fails to connect to gNB 903 but is far away from source gNB 901. However, if the UE-triggered configuration for gNB 902 is still available, the UE realizes that pre-configured conditions for UE-triggered handover to gNB 902 are indeed satisfied, and gNB 902 becomes the target for the UE-triggered handover. At step 944, UE 900 succeeds in UE-triggered handover to gNB 902.

When a candidate gNB is included in a CHO command, it means the candidate gNB has been prepared by the source gNB for the UE. The candidate gNB possesses the UE context and has reserved RACH resources for the UE. If the candidate gNB is then selected by source gNB as the target gNB for normal handover, the source gNB needs not to send another HANDOVER REQUEST message to the target gNB. Otherwise, if the selected target gNB is never prepared, the source gNB needs to send a HANDOVER REQUEST message to the target gNB and wait for ACK before sending handover command to UE. When a target gNB is selected, either by source gNB for the network-triggered handover or by UE for conditional handover, there may be other candidate gNBs still holding UE context and resources for CHO. These candidate gNBs can release the resources autonomously. Alternatively, if the source gNB initiates a normal handover, the source gNB may send notification to these candidate gNBs when the handover command is HARQ acknowledged.

Figure 10:
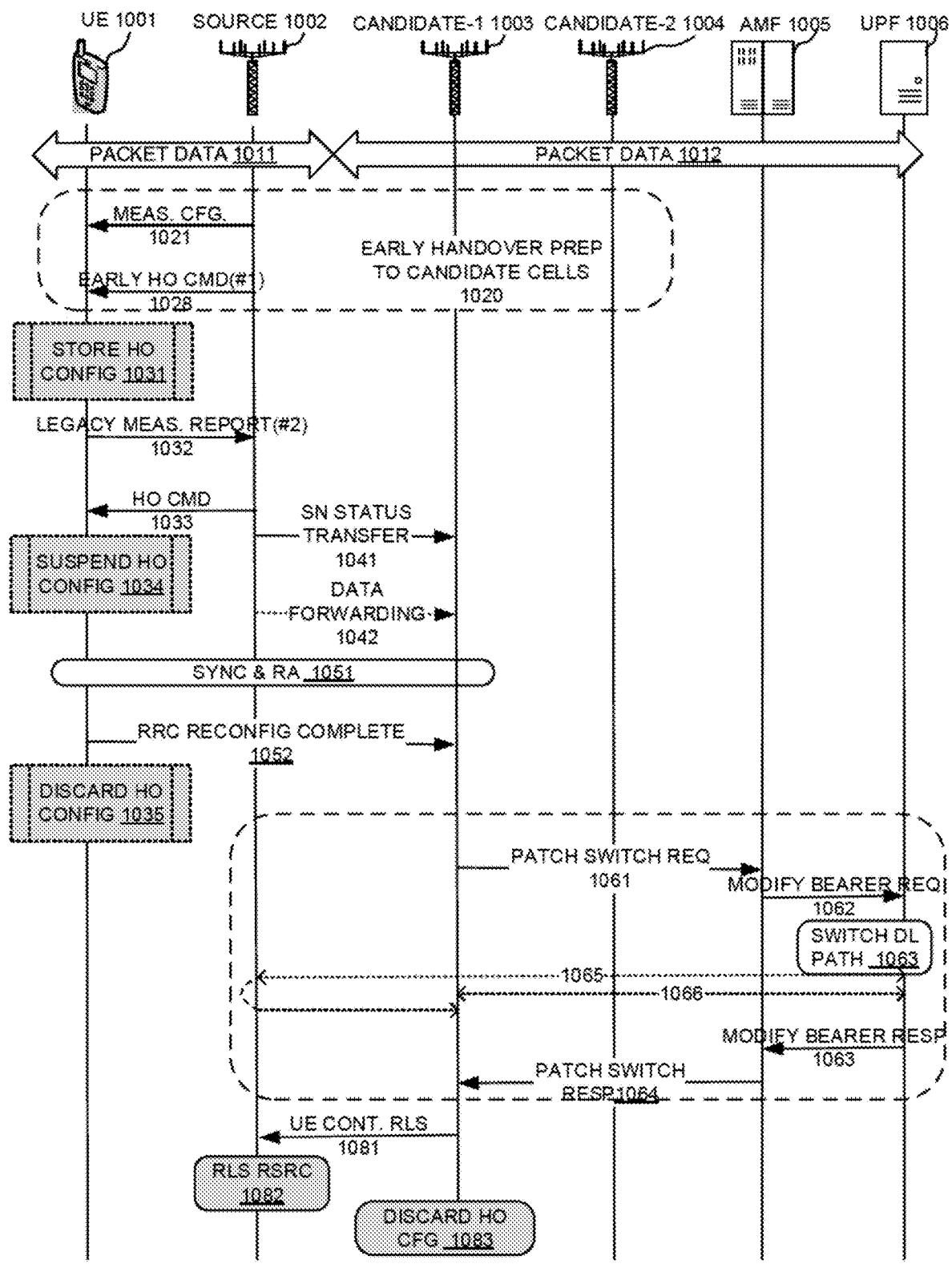
FIG. 10 illustrates an exemplary flow diagram for a network-triggered handover to a target cell being early prepared by an early handover command in accordance with embodiments of the current invention.

FIG. 10 illustrates an exemplary flow diagram for a network-triggered handover to a target cell being early prepared by an early handover command in accordance with embodiments of the current invention. UE 1001 is connected to source gNB 1002 with packet data 1011. The network also has gNB 1003 and 1004. Data path 1012 is established between source gNB 1002 and Core Access and Mobility Management Function (AMF) 1005 and user plan function (UPF) 1006. At step 1021, UE 1001 receives measurement report configuration from the network. The measurement report configuration includes early measurement report configuration and measurement events, such as the A3-like event with lower threshold. The network performs early handover preparation to candidate cells 1020. Procedure 1020 includes steps. UE 1001 sends early/conditional measurement report when corresponding configured event is triggered. Source gNB 1002 decides that a conditional handover is needed. Source gNB 1002 sends CONDITIONAL HANDOVER REQUEST to one or more candidate gNBs, such as gNB 1003 and/or gNB 1004. The selected one or more candidate gNBs performs admission control. The one or more candidate gNBs sends CONDITIONAL HANDOVER RESPONSE to serving gNB 1002 indicating the requested is being accepted or rejected.

At step 1028, source gNB 1002 sends an early handover command to UE 1001. In one embodiment, the one or more candidate gNBs prepare handover and the response message includes a transparent container to be sent to the UE carrying necessary information, such as the dedicated RACH preamble. Source gNB sends the early handover/CHO command to UE 1001. In one embodiment, the early handover command includes information obtained from the candidate cells, conditions for triggering the UE-triggered handover, such as threshold and corresponding time-to-trigger timer, and conditions for UE to exit the triggering condition, such as predefined offsets. In one embodiment, the early handover command may also include an early handover indication, which indicates the message is an early handover command. At step 1031, UE 1001 stores the received handover configuration in the early handover command.

Subsequently, UE 1001 detects legacy measurement trigger event. At step 1032, UE 1001 sends measurement report. Source gNB decides that a handover is needed and discovers that the target gNB 1003 is already prepared for conditional handover. Therefore, gNB 1002 sends SN status transfer to gNB 1003 at step 1041 and optionally at step 1042 forwarded data to gNB 1003. At step 1033, source gNB 1002 sends a handover command to UE 1001. At step 1034, UE 1001 suspends the CHO configuration.

At step 1051, UE 1001 performs synchronization and RA with gNB 1003. At step 1052, UE 1001 sends an RRC reconfiguration complete to gNB 1003. At step 1035, UE 1001 discards the CHO configuration. At step 853, gNB 804 sends sequence number (SN) status transfer request message to source gNB 802. At step 1061, gNB 1003 sends a PATH SWITCH REQUEST message to AMF 1005 to inform that the UE has changed cell. At step 1062, AMF 1005 sends a MODIFY BEARER REQUEST message to UPF 1006. At step 1063, UPF 1006 switches the downlink data path to the target side via 1066. UPF 1006 sends one or more END MAKER packets 1065 on the old path to source gNB 1002. At step 1063, UPF 1006 sends a MODIFY BEARER RESPONSE to AMF 1005. AMF 1005, at step 1064, confirms the PATH SWITCH REQUEST with the PATH SWITCH REQUEST ACK message. At step 1081, gNB 1003 sends UE CONTEXT RELEASE and informs the success of handover to gNB 1002. gNB 1002, at step 1082 releases resources including the radio and C-plane related resources associated with the UE context. At step 1083, gNB 1003 discards the handover configuration.

Figure 11:
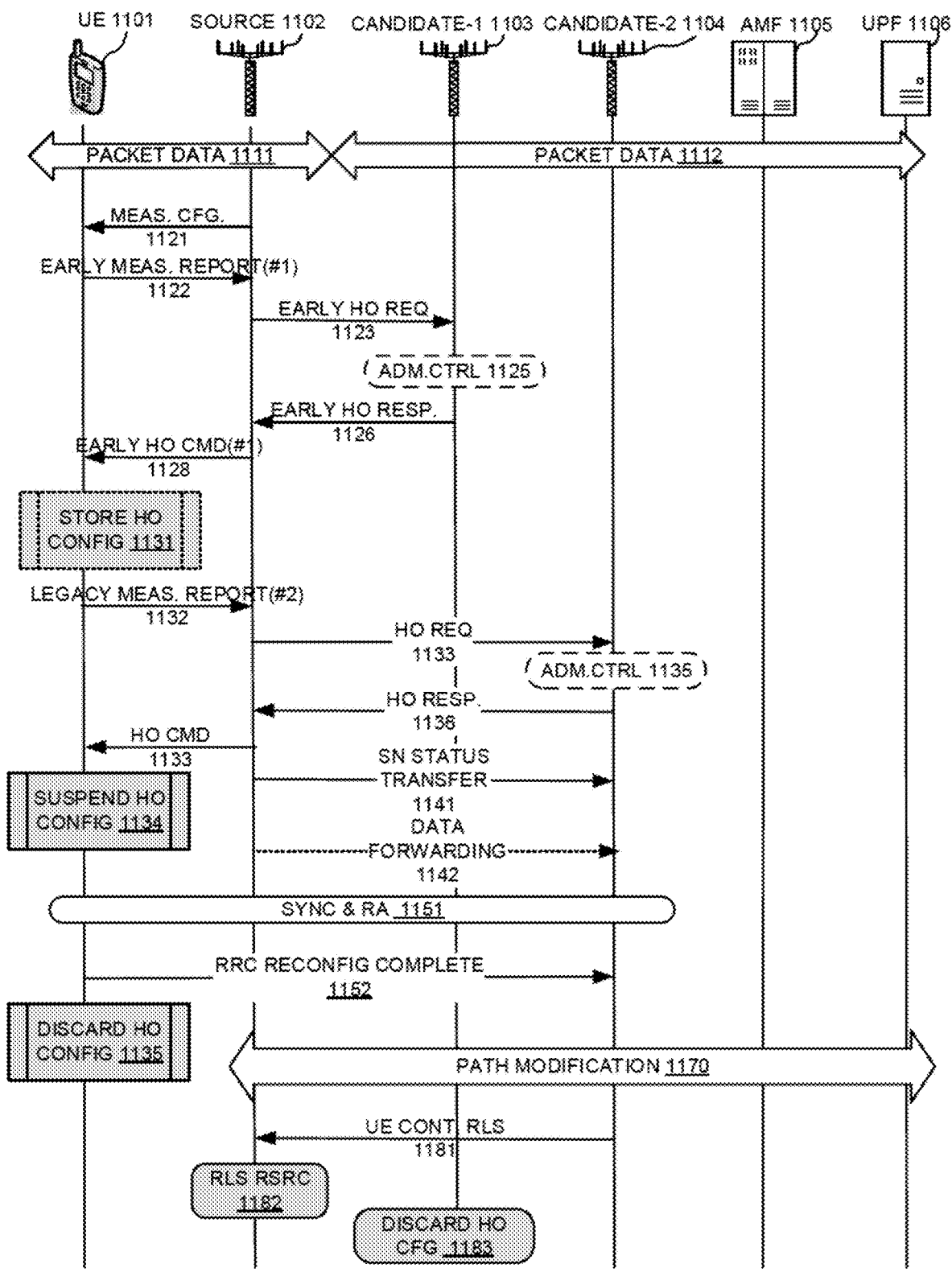
FIG. 11 illustrates an exemplary flow diagram for a network-triggered handover to a target cell not prepared in accordance with embodiments of the current invention.

FIG. 11 illustrates an exemplary flow diagram for a network-triggered handover to a target cell not prepared in accordance with embodiments of the current invention. UE 1101 is connected to source gNB 1102 with packet data 1111. The network also has gNB 1103 and 1104. Data path 1112 is established between source gNB 1102 and AMF 1105 and UPF 1106. At step 1121, UE 1101 receives measurement report configuration, similar to that as in 1021, from the network. At step 1122, UE 1101 sends an early measurement report to gNB 1102. At step 1123, gNB 1102 sends early HO request to gNB 1103. At step 1125, gNB 1103 prepares handover and performs admission control. At step 1126, gNB 1103 sends HO response to gNB 1102.

At step 1128, source gNB 1102 sends an early handover command to UE 1101. At step 1131, UE 1101 stores the received handover configuration in the early handover command.

Subsequently, UE 1101 detects legacy measurement trigger event. At step 1132, UE 1101 sends measurement report. Source gNB decides that a handover is needed and discovers that the target gNB 1104 is not prepared for the handover. At step 1133, gNB 1102 sends HO request to gNB 1104. At step 1135, gNB 1104 performs admission control. At step 1136, gNB 1104 sends HO response to gNB 1102. At step 1133, source gNB 1102 sends a handover command to UE 1101. At step 1134, UE 1101 suspends the CHO configuration.

At step 1151, UE 1101 performs synchronization and RA with gNB 1104. At step 1152, UE 1101 sends an RRC reconfiguration complete to gNB 1104. At step 1135, UE 1101 discards the CHO configuration. At step 1141, gNB 1102 sends sequence number (SN) status transfer to gNB 1104. At step 1142, gNB 1102 performs data forwarding to gNB 1104. Path modification 1170 are performed similar to that in steps 1061 to 1065. At step 1181, gNB 1104 sends UE CONTEXT RELEASE and informs the success of handover to gNB 1102. gNB 1102, at step 1182 releases resources including the radio and C-plane related resources associated with the UE context. At step 1183, gNB 1103 discards the handover configuration.

Figure 12:
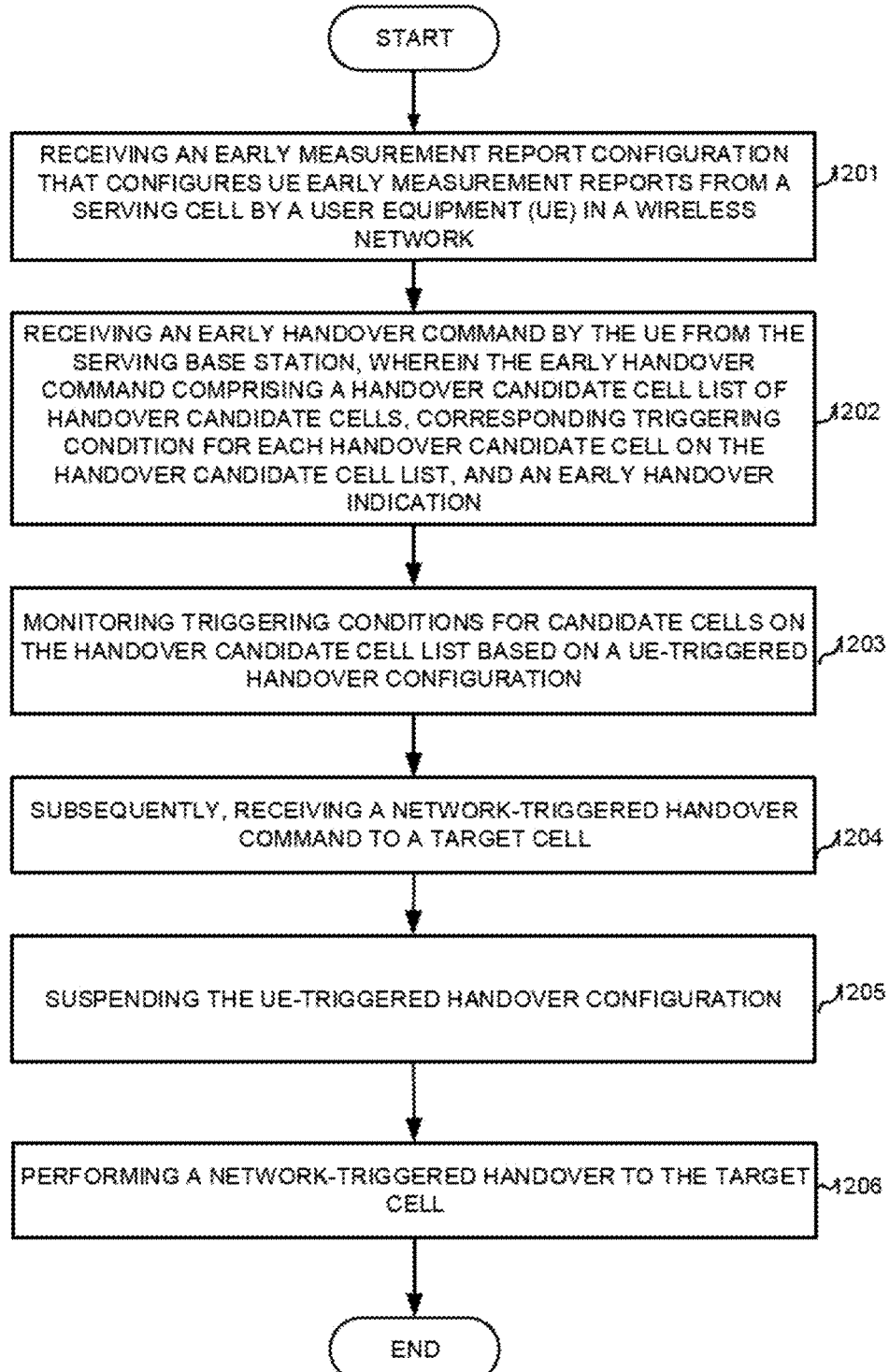
FIG. 12 illustrates an exemplary diagram for the UE to perform the early handover preparation and UE-triggered handover in accordance with embodiments of the current invention.

FIG. 12 illustrates an exemplary diagram for the UE to perform the early handover preparation and UE-triggered handover in accordance with embodiments of the current invention. At step 1201, the UE receives an early measurement report configuration that configures UE early measurement reports from a serving cell in a wireless network. At step 1202, the UE receives an early handover command from the serving base station, wherein the early handover command comprising at least one early handover elements comprising a handover candidate cell list of handover candidate cells, corresponding triggering condition for each handover candidate cell on the handover candidate cell list, and an early handover indication. At step 1203, the UE monitors triggering conditions for candidate cells on the handover candidate cell list based on a UE-triggered handover configuration. At step 1204, subsequently, the UE receives a network-triggered handover command to a target cell. At step 1205, the UE suspends the UE-triggered handover configuration. At step 1206, the UE performs a network-triggered handover to the target cell.

Figure 13:
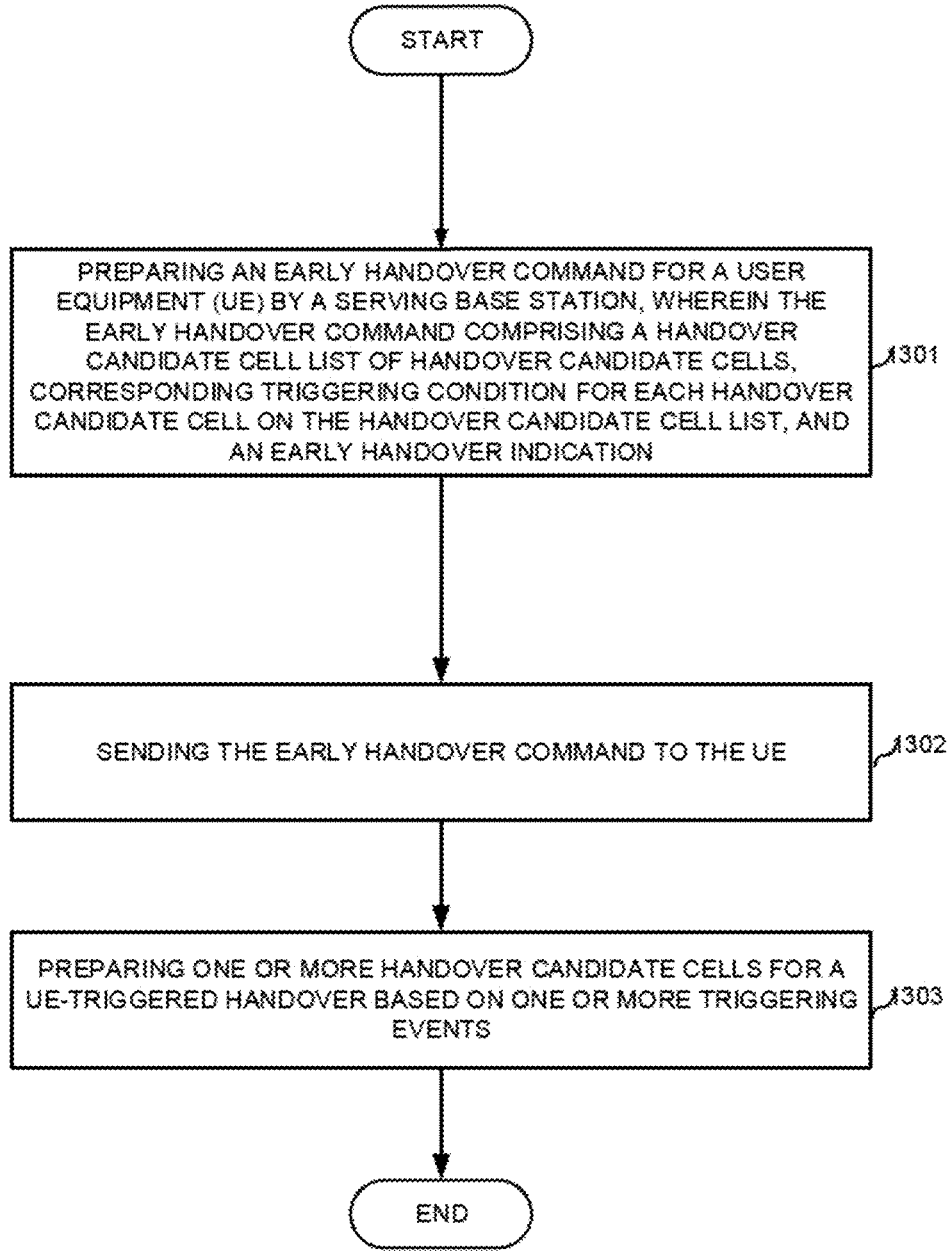
FIG. 13 illustrates an exemplary diagram for the source base station to perform the early handover preparation and UE-triggered handover in accordance with embodiments of the current invention.

FIG. 13 illustrates an exemplary diagram for the source base station to perform the early handover preparation and UE-triggered handover in accordance with embodiments of the current invention. At step 1301, the source base station prepares an early handover command for a UE, wherein the early handover command comprising at least one early handover elements comprising a handover candidate cell list of handover candidate cells, corresponding triggering condition for each handover candidate cell on the handover candidate cell list, and an early handover indication. At step 1302, the source base station sends the early handover command to the UE. At step 1303, the source base station prepares one or more handover candidate cells for a UE-triggered handover based on one or more triggering events.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
receiving an early measurement report configuration that configures UE early measurement reports from a serving cell by a user equipment (UE) in a wireless network;
receiving an early handover command by the UE from the serving base station, wherein the early handover command includes at least one early handover elements comprising a handover candidate cell list of handover candidate cells, corresponding triggering condition for each handover candidate cell on the handover candidate cell list;
monitoring triggering conditions for candidate cells on the handover candidate cell list based on a UE-triggered handover configuration;
subsequently, receiving a network-triggered handover command to a target cell;
suspending the UE-triggered handover configuration; and
performing a network-triggered handover to the target cell;
wherein the UE discards the UE-triggered handover configuration upon a successful completion of a network-triggered handover to the target cell.

2. The method of claim 1, wherein the handover candidate cell list in the early handover command is based on one or more early measurement reports performed by the UE according to the received early measurement report configuration.

3. The method of claim 1, wherein the UE sends an early measurement report upon detecting one or more reporting conditions comprising detecting a cell quality of a neighboring cell being higher than a predefined quality threshold and detecting a cell quality of a neighboring cell being an predefined offset higher than a cell quality of the serving cell.

4. The method of claim 3, wherein the UE operates in a multi-beam network, and the cell quality is determined be over a threshold by meeting at least one condition comprising a weighted average of qualities of some or all of beams being over the threshold, and a predefined number of beams with corresponding measurement being above the threshold.

5. The method of claim 1, further comprising: storing the UE-triggered handover configuration upon receiving the early handover command, wherein the UE-triggered handover configuration comprises the handover candidate cell list of handover candidate cells.

6. The method of claim 1, wherein the UE-triggered handover configuration further comprising at least one of corresponding cell identification (ID) of each candidate cell, corresponding C-RNTI, and corresponding security algorithm identifier of each candidate cell.

7. The method of claim 1, wherein the UE resumes the suspended UE-triggered handover configuration upon a failure of a network-triggered handover to the target cell.

8. The method of claim 7, further comprising performing a UE-triggered handover to a candidate cell on the handover candidate cell list when corresponding one or more triggering conditions for the candidate cell are satisfied.

9. The method of claim 8, wherein the performing of UE-triggering handover to the candidate cell involves: performing a random access to the candidate cell; and sending a handover complete message to the serving cell upon success of the random access.

10. A user equipment (UE) comprising:
a transceiver that transmits and receives radio signals in a wireless network;
a measurement report circuit that receives an early measurement report configuration that configures UE early measurement reports from a serving cell;
a handover command receiver that receives an early handover command from the serving base station, wherein the early handover command comprising at least one early handover elements comprising a handover candidate cell list of handover candidate cells, corresponding triggering condition for each handover candidate cell on the handover candidate cell list;
a condition monitor that monitors triggering conditions for candidate cells on the handover candidate cell list based on a UE-triggered handover configuration; and
a handover circuit that upon receiving a network-triggered handover command to a target cell suspends the UE-triggered handover configuration;
wherein the handover circuit discards the UE-triggered handover configuration upon a successful completion of a network-triggered handover to the target cell.

11. The UE of claim 10, wherein the measurement report circuit sends an early measurement report upon detecting one or more reporting conditions comprising detecting a cell quality of a neighboring cell being higher than a predefined quality threshold and detecting a cell quality of a neighboring cell being a predefined offset higher than a cell quality of the serving cell.

* * * * *